(12) United States Patent
Masson et al.

(10) Patent No.: US 9,927,560 B2
(45) Date of Patent: Mar. 27, 2018

(54) ANTI-MOIRÉ PATTERN DIFFUSER FOR OPTICAL SYSTEMS

(71) Applicant: Intel Corporation, Santa Clara, CA (US)

(72) Inventors: Jonathan Masson, Pully (CH); Christophe Le Gros, Lausanne (CH); Lucio Kilcher, Montreux (CH)

(73) Assignee: INTEL CORPORATION, Santa Clara, CA (US)

( * ) Notice: Subject to any disclaimer, the term of this patent is extended or adjusted under 35 U.S.C. 154(b) by 110 days.

(21) Appl. No.: 14/920,437

(22) Filed: Oct. 22, 2015

(65) Prior Publication Data

US 2016/0116647 A1    Apr. 28, 2016

Related U.S. Application Data

(60) Provisional application No. 62/067,352, filed on Oct. 22, 2014.

(51) Int. Cl.

| | |
|---|---|
| *G02B 26/08* | (2006.01) |
| *G02B 5/02* | (2006.01) |
| *G02B 26/10* | (2006.01) |
| *G02B 27/28* | (2006.01) |
| *G03B 21/20* | (2006.01) |
| *G02B 5/30* | (2006.01) |

(52) U.S. Cl.
CPC ......... *G02B 5/0294* (2013.01); *G02B 5/3058* (2013.01); *G02B 26/105* (2013.01); *G02B 27/286* (2013.01); *G03B 21/208* (2013.01); *G03B 21/2073* (2013.01)

(58) Field of Classification Search
CPC .. G02B 5/3058; G02B 5/0294; G02B 27/286; G02B 26/105; G03B 21/208; G03B 21/2073
USPC ...... 359/486.01–486.03, 599, 250–253, 298, 359/301, 303, 316, 465, 207.9
See application file for complete search history.

(56) References Cited

U.S. PATENT DOCUMENTS 6,067,193 A * 5/2000 Sekine ................ G02B 27/283
349/5
6,304,381 B1  10/2001 Hayashi
(Continued)

FOREIGN PATENT DOCUMENTS

| CN | 102809868 | 12/2012 |
| CN | 103226247 | 7/2013 |
| JP | H06-53120 | 2/1994 |

OTHER PUBLICATIONS

Search Report and Office Action received for Taiwanese Patent Application No. 104134549, dated Dec. 7, 2016, 27 pages including 14 pages English translation.
(Continued)

*Primary Examiner* — James Phan

(57) ABSTRACT

Disclosed herein are devices and techniques related to optical diffusers and particularly, diffusers to reduce moiré patterns in a projected image. The device may comprise an array of micro-focal elements or reflectors and a light polarization grid. The light polarization grid configured to change a polarization between portions of a light beam and the micro-focal elements of reflectors to diffuse the light beam such that portions of the light beam having a difference in polarization may meet at a point.

10 Claims, 13 Drawing Sheets

(56) References Cited

U.S. PATENT DOCUMENTS

| | | |
|---|---|---|
| 2005/0073472 A1 | 4/2005 | Kim et al. |
| 2005/0225629 A1 | 10/2005 | Kubota et al. |
| 2006/0152812 A1 | 7/2006 | Woodgate et al. |
| 2008/0204872 A1 | 8/2008 | Ijzerman et al. |
| 2009/0067057 A1 | 3/2009 | Sprague et al. |
| 2015/0253469 A1 | 9/2015 | Le Gros et al. |

OTHER PUBLICATIONS

International Search Report and Written opinion received for PCT Patent Application No. PCT/US2015/056952, dated Feb. 15, 2016, 14 pages.

\* cited by examiner

ANTI-MOIRÉ PATTERN DIFFUSER FOR OPTICAL SYSTEMS

CROSS-REFERENCE TO RELATED APPLICATIONS

This application claims the benefit of and priority to previously filed U.S. Patent Provisional Application Ser. No. 62/067,352 filed Oct. 22, 2014, entitled "Anti-Moiré Pattern Diffuser for Optical Systems", the subject matter of which is incorporated herein by reference in its entirety.

TECHNICAL FIELD

Embodiments herein generally relate to optical systems and particularly to optical system diffusers.

BACKGROUND

Modern image projection systems may include one or more optical diffusers. In general, an optical diffuser may be implemented to spread out a light beam. With respect to projection systems, diffusers may be implemented to form a field of view in which images may be projected. Modern projection systems may use micro-lenses or micro-mirrors to implement diffusers. However, diffusers implemented with micro-mirrors or micro-lenses may result in moiré-patterns being manifest in the projected image.

DETAILED DESCRIPTION

Figure 1:
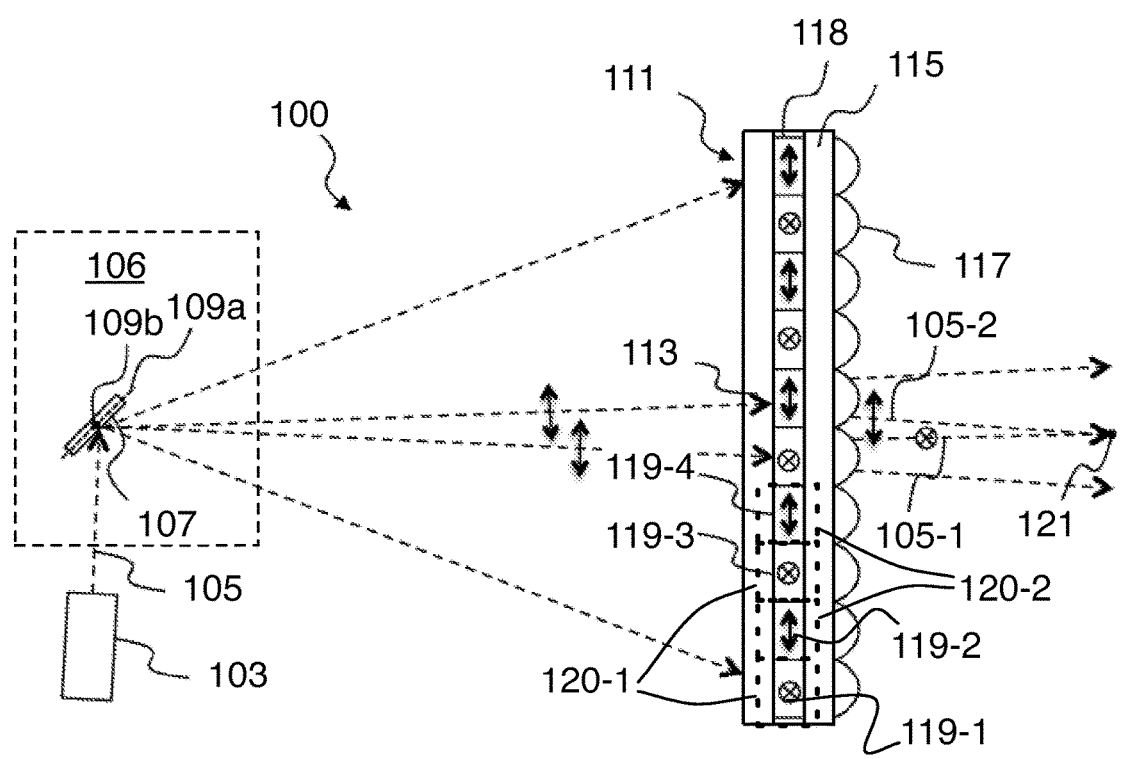
FIG. 1 illustrates a block diagram of a first example optical system.

Various embodiments described herein are generally directed to optical diffusers. In particular, the present disclosure may be implemented to provide optical diffusers for image projection systems. Various examples may provide an optical diffuser comprising an array of micro-focal elements configured to diffuse multiple coherent waves of light and a light polarization grid configured to generate a difference in polarization between the light waves.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 is a block diagram illustrating an example of an optical system 100. In general, the optical system 100 may be implemented in any of a variety of projection systems. In some examples, the system 100 may be implemented in a heads up display (HUD) system. Such a HUD system may be implemented in, for example, cars, airplanes, trains, boats, glasses, head worn devices, or the like. It is noted, that the optical system 100 may be referenced as a light projection system. However, examples are not limited in these contexts.

The system 100 can include a light source 103. In some examples, the light source 103 may be a laser light source, which emits a light beam 105. With some examples, the light beam 105 may have a linear polarization. It is noted, that the light beam 105 may be comprised of a number of light waves, each having a substantially identical polarization. Additionally, the light beam 105 may be coherent.

The system 100 additionally includes a scanning mirror system 106. The light source 103 and the scanning mirror system 106 are arranged such that the scanning mirror system 106 can receive light emitted by the light source 103. With some examples, the scanning mirror system 106 may be a Micro-Electro-Mechanical System (MEMS) scanning mirror. Such a MEMS system, for example, can include a movable plate comprising a mirror 107, which is arranged to be rotated about two mutually orthogonal axes. For example, this figure illustrates the system 106 comprising the mirror 107 arranged to rotate about the axis 109a and 109b. With some examples, the mirror 107 may rotate about a single axis only. As another example, the system 106 may include multiple mirrors, for example two mirrors arranged to rotate about mutually orthogonal axes. Examples are not limited in this context.

In general, the scanning mirror system 106 can scan the light beam 105 over a projection surface to project a real image onto the surface. The system 100 additionally includes a light diffuser 111 to diffuse light that is incident on the diffuser 111. In particular, the diffuser 111 is configured to transmit and diffuse light incident on the diffuser 111. For example, light from the light beam 105 is depicted as incident on the diffuser 111 and diffused light (e.g., waves 105-1, 105-2, etc.) are depicted as being transmitted through the diffuser 111. It is noted, that the light waves 105-1 and 105-2 may be referred to as light rays. With some examples, the diffuser 111 comprises a first transparent substrate 113 and a second transparent substrate 115. In some examples, the substrates 111 and/or 113 may comprise glass, quartz, sapphire, polyethylene terephthalate (PET), polycarbonate, poly(methyl methacrylate) (PMMA), polymer, plastic or a combination of the above materials.

The diffuser 111 also comprises an array of micro-focal elements 117. In some examples, the array of micro-focal elements 117 may be disposed on the substrate 115. In some examples, the micro-focal elements 117 may have a convex shape. In general, the micro-focal elements 117 are at least partially transmissive (or transparent) to the light beam 105. In some examples, the micro-focal elements 117 can comprise glass, quartz, sapphire, PET, polycarbonate, PMMA, polymer, plastic or a combination of the above materials. In some examples, the micro-focal elements 117 may have a diameter of between 1 µm to 5000 µm. In some examples, the micro-focal elements 117 may have a diameter of between 50 µm to 1000 µm.

The diffuser 111 can additionally include a light polarization grid 118. In some examples, the light polarization grid 118 is disposed between the first substrate 113 and the second substrate 115. In general, the light polarization grid 118 may have a patterned structure comprising a number of cells (or regions) 119-$a$, where a is a positive integer. For example, cells 119-1, 119-2, 119-3, and 119-4 are depicted. In general, some (or all) of the cells 119-$a$ may be configured to modify or change the polarization of light transmitted through the cells. In some examples, some of the cells 119-$a$ may be configured to change the polarization of light transmitted through the cells in a number of ways. For example, the cells 119-1 and 119-3 may be configured to change the polarization of light passing through these cells in a first manner while the cells 119-2 and 119-4 may be configured to transmit light without substantially modifying the polarization. As another example, the cells 119-1 and 119-3 may be configured to modify the polarization of light passing through these cells in a first manner, while the cells 119-2 and 119-4 may be configured to modify the polarization of light passing through these cells in a second manner, where the first and second manner may be different. Additional examples of how the polarization can be modified are given in greater detail below.

In general, the cells 119-$a$ are grouped into cell groups 120. For example, a first cell group 120-1 and a second cell group 120-2 may be provided. Each of the cell groups 120 may comprise alternating ones of the cells 119, respectively. For example, cells 119-1, 119-3, etc. may be included in the cell group 120-1 while cells 119-2, 119-4, etc. may be included in the cell group 120-2. With some examples, a cell 119-$a$ may be provided for each micro-focal element 117. Furthermore, with some examples, a cell 119-$a$ may be aligned with a respective micro-focal element 117. It is noted, that two orthogonal linear polarizations do not substantially interfere with each other or a right handed circular polarization and a left handed circular polarization do not substantially interfere with each other. For example, if light transmitted through two consecutive micro-focal elements 117 have linear polarizations, which are orthogonal to each other, then the light transmitted through these two consecutive micro-focal elements will not substantially interfere with each other. Accordingly, diffused light waves that have traversed (e.g., been transmitted through, or the like) the cell 119-3 and the cell 119-4 at least once, will not interfere with each other.

For example, if the light waves (e.g., portion of the light beam 105) input to consecutive cells (e.g., the cells 119-3 and 119-4, or the like) have a linear polarization, then the diffused light waves emitted from these cells (e.g., the light waves 105-1, 105-2, or the like) have polarizations that are orthogonal to each other. If on the other hand the input light waves have a circular or elliptical polarization, then the diffused light waves have opposite electric fields' rotational directions. In particular, the rotational direction of one light wave (e.g., the wave 105-1) may be to the left while the rotational direction of the other light wave (e.g., the wave 105-2) is to the right; or said differently, the handedness of the polarizations of the diffused light waves are different. With some examples, the input light wave can have a linear polarization, which is transformed into a right handed and/or a left handed circular or elliptic polarization. With some examples, the input light can have a circular polarization and the output wave can be two orthogonal linear polarized light waves.

As noted above, with some examples, a first group of cells (e.g., the group 120-1, or the like) including a select number of the cells (e.g., the cells 119-1, 119-3, etc.) are arranged to change the polarization of the light beam, while another group of cells (e.g., the group 120-2, or the like) including the other cells (e.g., the cells 119-2, 119-4, etc.) are configured to not substantially modify the polarization of the light passing through them. For example, assuming the light waves incident on the cells 119-$a$ have a linear polarization, FIG. 1 depicts the cells 119-1, 119-3, etc. as being configured to rotate the polarization by substantially 90 degrees, such that the resulting polarization is orthogonal with respect to the polarization of the incoming light. Accordingly, the diffused light waves transmitted through the diffuser 111 may not substantially interfere with each other. For example, the light waves 105-1 and 105-2 are depicted as being incident at point 121. However, as the polarization of the light wave 105-1 have been rotated 90 degrees and is now orthogonal to the polarization of the light wave 105-2 these waves may not substantially interfere with each other.

In some examples, a number of the cell 119-$a$ of the light polarization grid 118 may be a wave plate, also known as a retarder. As a specific example, these cells 119-$a$ may be a half-wave plate configured to shift the polarization direction of linearly polarized light. As another specific example, these cells 119-$a$ may be a quarter-wave plate configured to convert linearly polarized light into circularly polarized light or convert circularly polarized light into linearly polarized light. In some examples, a quarter-wave plate may be implemented to produce an elliptical polarization. In some examples, these cells 119-$a$ may be a photo-aligned wave plates. With some examples, the light polarization element 118, and particularly, the wave plates can be constructed out of a birefringent material, such as, for example, quartz, liquid crystal, cross-linkable liquid crystal, plastics or mica. In some example, the birefingent may have an index of refraction different than the orientations of light passing through it.

If the cells 119-$a$ of the light polarization grid 118 are a quarter wave plate, then the optical axis of the first group of cells (e.g., the cells 119-1, 119-3, etc.) may be aligned at +45 degrees in relation to the input polarization to obtain a right handed circular polarization. The optical axis of the second group of cells (e.g., the cells 119-2, 119-4, etc.) may be oriented at −45 degrees in relation to the input polarization such that the output polarization is left handed circular. Right hand and left hand circular polarized light do not substantially interfere with each other and as a consequence the moiré pattern will not be created or it will be reduced at the point 121.

In some examples, the light polarization grid 118 may comprise cross-linkable liquid crystal. In some examples, the cells in the first group (e.g., cells 119-1, 119-3, etc.) may comprise a fist linkable liquid crystal material while the cells in the second group (e.g., cells 119-2, 119-4, etc.) comprise a second linkable liquid crystal material, wherein the first and second material are different. In some examples, the cells 119-a may comprise the same type of linkable liquid crystal material but may have different orientations of their optical axes. In particular, the cells 119-1, 119-3, etc. may have a first orientation of their optical axes while the cells 119-2, 119-4, etc. have a second orientation of their optical axes, where the first orientation and the second orientation are different.

It is noted, the behavior of a wave plate may depend on the the system implementation, for example, on the thickness of the crystal, the angle of incidence of the light beam, the wavelength of light, the orientation of the optical axis and the variation of the index of refraction. By appropriate choice of the relationship between these parameters, it is possible to introduce a controlled phase shift between the two polarization components (horizontal and vertical polarization components) of a light wave, thereby altering its polarization.

Figure 2:
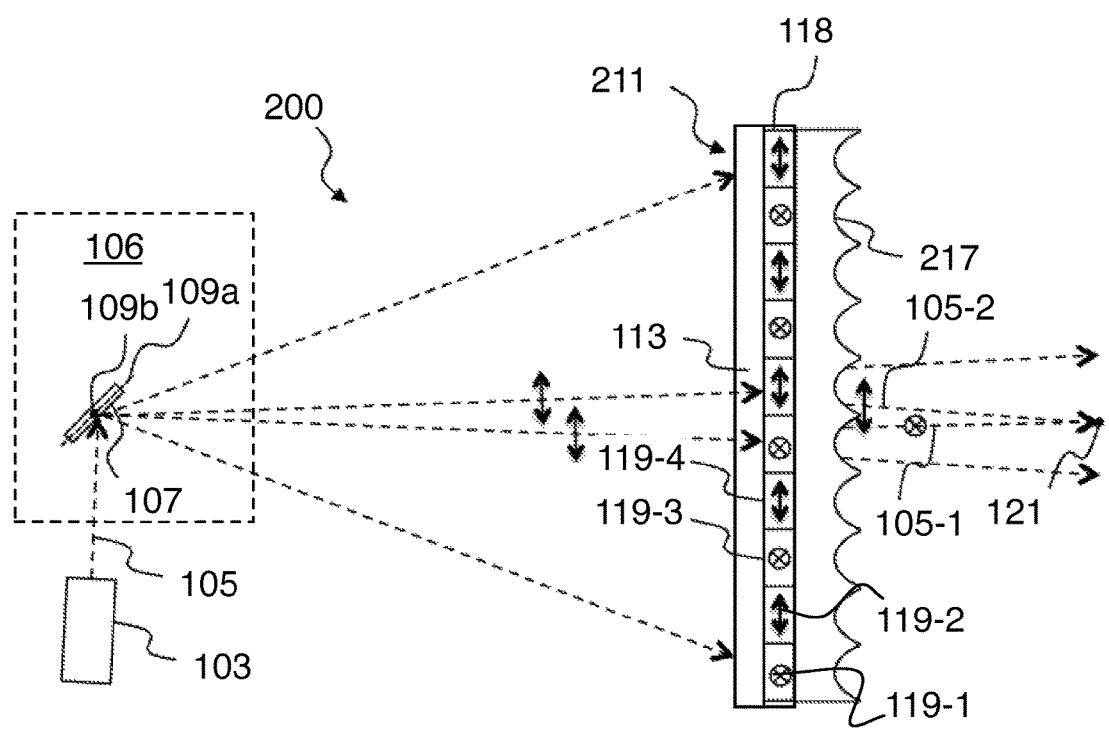
FIG. 2 illustrates a block diagram of a second example optical system.

FIG. 2 is a block diagram illustrating an example of an optical system 200. The optical system 200 is described with reference and use of the numeric designators of FIG. 1 for convenience and clarity of presentation. However, the examples are not limited in this context.

It is noted, that the system 200 may includes a number of similar and/or same components as depicted in the system 100, including the light source 103 and the scanning mirror system 106. However, the system 200 includes a diffuser 211 including an array of micro-focal elements 217. In general, the micro-focal elements 217 may be similar to the micro-focal elements 117, with a notable distinction being the micro-focal elements 217 are concave in shape, as depicted. The diffuser 211 may operate similar to the diffuser 111 in that waves from the light beam 105 are transmitted through the diffuser 211 and may have their polarization modified by the polarization grid 118 such that light waves transmitted through adjacent cells 119-a of the polarization grid 118 may not substantially interfere with each other.

Figure 3:
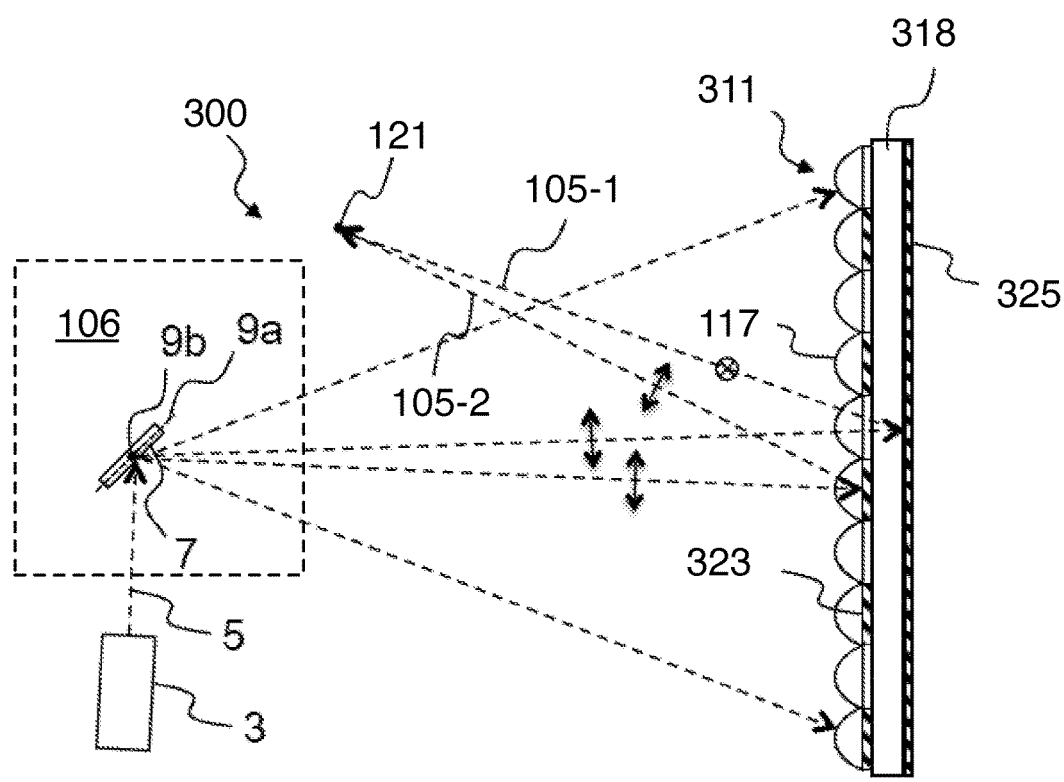
FIG. 3 illustrates a block diagram of a third example optical system.

FIG. 3 is a block diagram of an example of an optical system 300. The optical system 300 is described with reference and use of the numeric designators of FIG. 1 for convenience and clarity of presentation. However, the examples are not limited in this context.

It is noted, that the system 300 may includes a number of similar and/or same components as depicted in the system 100, including the light source 103 and the scanning mirror system 106. However, the system 300 includes a diffuser 311 that operates by reflecting the light beam 105 (as opposed to transmitting the light beam 105 as depicted in FIGS. 1-2). The diffuser 311 may include the array of micro-focal elements 117 disposed on a patterned reflective surface 323. In particular, the array of micro-focal elements 117 are depicted as disposed on the patterned reflective surface facing the scanning mirror system 106. As such, the light beam emitted by the light source 103 and reflected by the mirror 107 passes through the array of micro-focal elements 117 and is reflected by the surface 323.

In some examples, the surface area of the patterned reflective surface 323 may be substantially equal to the frontal surface area of the array of micro-focal lenses 117. The diffuser 311 may also include a polarization grid 318, such as, for example, a quarter-wave plate, disposed between the patterned reflective surface 323 and a backside reflective surface 325. As depicted, the patterned reflective surface 323 is patterned such that the reflective surface 323 is disposed between alternating lenses of the array of micro-focal lenses 117. It is noted, that the reflective surface 323 may have cells or portions similar to the cells 119-a discussed above, which can be patterned onto the surface 318.

During operation, when the light beam 105 is incident on the array of micro-focal lenses 117 it is transmitted through the array. For lenses disposed over a reflective surface 323, the light beam 105 is reflected back into the micro-focal lens and it is diffused with the same input polarization to form the diffused light beam. In particular, the light wave 105-2 of the light beam 105 is incident on the reflective surface 323 and reflected back out with substantially the same polarization. Conversely, if the light beam 105 is not incident on the reflective surface 323, then the light beam 105 passes through the light polarization grid 318 and is reflected by the surface 325. In particular, as the light beam 105 passes through the polarization grid 318 the first time, the polarization is changed from a linear polarization into a circular polarization. The beam is then reflected by the mirror 325 and the polarization handedness is changed from a right circular polarization to a left circular polarization. The beam then again passes through the polarization grid 319 and the polarization changed from a circular polarization to a linear polarization. However, as the handedness was changed by the mirror 325, then the polarization of the light beam is orthogonal to the original polarization. For example, the polarization of the light beam 105-1 is changed to orthogonal from the original polarization by operation of the polarization grid 318 and the mirror 325.

Accordingly, the diffused light waves 105-1 and 105-2 may not substantially interfere with each other and may reduce a moiré pattern when the waves meet at the point 121.

Figure 4:
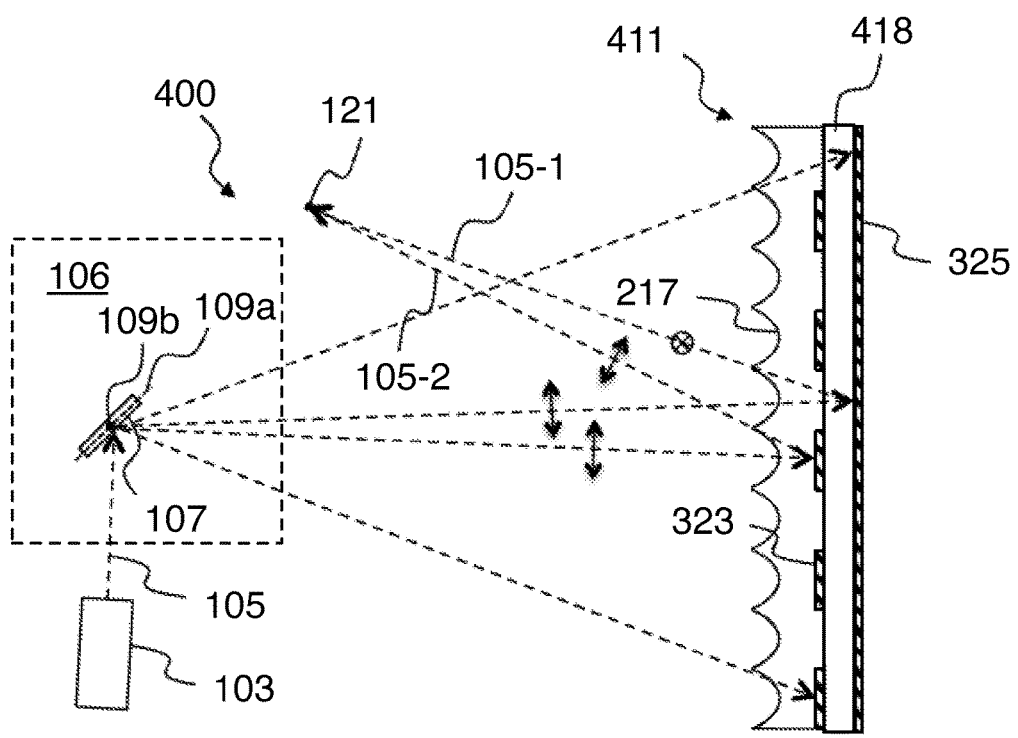
FIG. 4 illustrates a block diagram of a fourth example optical system.

FIG. 4 is a block diagram illustrating an example of an optical system 400. The optical system 400 is described with reference and use of the numeric designators of FIGS. 1-3 for convenience and clarity of presentation. However, the examples are not limited in this context.

It is noted, that the system 400 may includes a number of similar and/or same components as depicted in the system 300, including the light source 103 and the scanning mirror system 106. However, the system 400 includes a diffuser 411 including an array of micro-focal elements 217. In general, the micro-focal elements 217 may be similar to the micro-focal elements 117, with a notable distinction being the micro-focal elements 217 are concave in shape, as depicted. The diffuser 411 may operate similar to the diffuser 311 in that waves from the light beam 105 are reflected by the diffuser 411 and may have their polarization modified by the polarization grid 318 such that light waves reflected by the diffuser (e.g., diffused light waves 105-1 and 105-2, a diffused light beam, or the like) may not substantially interfere with each other.

Figure 5:
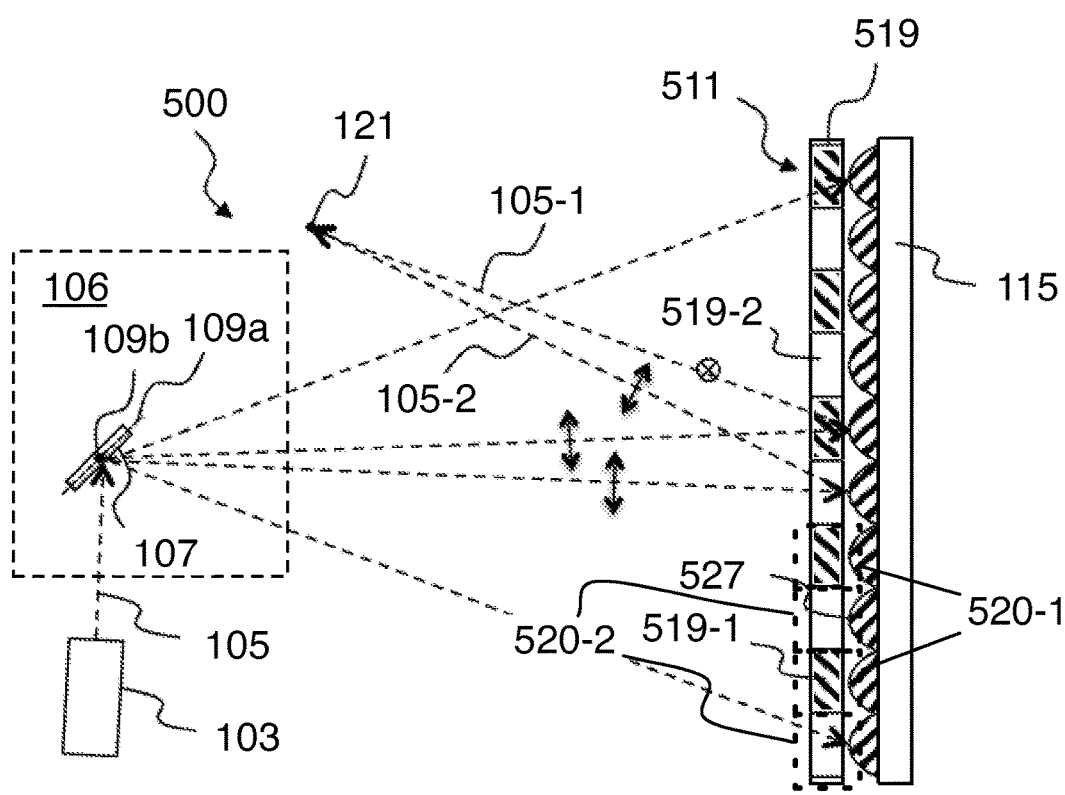
FIG. 5 illustrates a block diagram of a fifth example optical system.

FIG. 5 is a block diagram of an example of an optical system 500. The optical system 500 is described with reference and use of the numeric designators of FIG. 1 for convenience and clarity of presentation. However, the examples are not limited in this context.

It is noted, that the system 500 may includes a number of similar and/or same components as depicted in the system 100, including the light source 103 and the scanning mirror system 106. However, the system 500 includes a diffuser 511 that operates by reflecting the light beam 105 (as opposed to transmitting the light beam 105 as depicted in FIGS. 1-2). The diffuser 511 may include the array of micro-mirrors 527 disposed on the substrate 115. In particular, the array of micro-mirrors 527 are depicted as disposed on the substrate 115 facing the scanning mirror system 106.

In some examples, the micro-mirrors 527 may have a convex shape. In some examples, the micro-mirrors 527 may comprise a metal, such as copper, nickel, aluminium, gold, steel, or any combination of the above. In some examples, the micro-mirrors 527 may comprise silicon, glass, polymer, photoresist, PMMA, polycarbonate, quartz, sapphire, PET, or any combination of the above. In some examples, the micro-mirrors 527 may have a reflective coating comprising aluminium, silver, nickel, gold, or any combination of these.

The diffuser 511 additionally includes a polarization grid 518 disposed between the micro-mirrors 527 and the scanning mirror system 106. The polarization grid 518 may comprise cells 519-a. In particular, the element 518 may comprise a first group of cells 520-1 (e.g., including cells 519-1, etc.) and a second group of cells 520-2 (e.g., including cells 519-2, etc.). In some examples, the cells 519-a in the first group 520-1 may comprise a quarter-wave plate and cells 519-a in the second group 520-2 may comprise a transparent material configured to not substantially change the polarization of lights transmitted there through. As illustrated, the cells 519-a in the first and second cell groups 520-1 and 520-2 may be alternatively placed in the light polarization grid 518.

During operation, when the light beam 105 having a linear polarization is incident on the first group of cells 520-1 (e.g., the quarter-wave plate portion of the polarization grid 518, the cells 519-1, etc., or the like), the input polarization is transformed into a right circular polarization. The light is then reflected on the micro-mirror 527 and it is diffused back with a left circular polarization into the cells in the first group 520-1. Accordingly, the diffused light beam 105 (e.g., the light wave 105-1, or the like) has a linear polarization that is rotated by about 90 degrees compared to the input polarization.

When the input light beam 105 is incident on, for example, the cell 519-a in the second group 520-2, it is transmitted without substantially changing the polarization direction. It is diffused by the micro-mirror 527 to form a diffused beam having the same polarization as the input beam 105. However, the diffused beam has a polarization perpendicular to the beam transmitted through the adjacent cell (e.g., the cell 519-1, or the like). Thus the diffused beams 105-1 and 105-2 may not interfere and may not create or may reduce a moiré pattern at the point 121.

Figure 6:
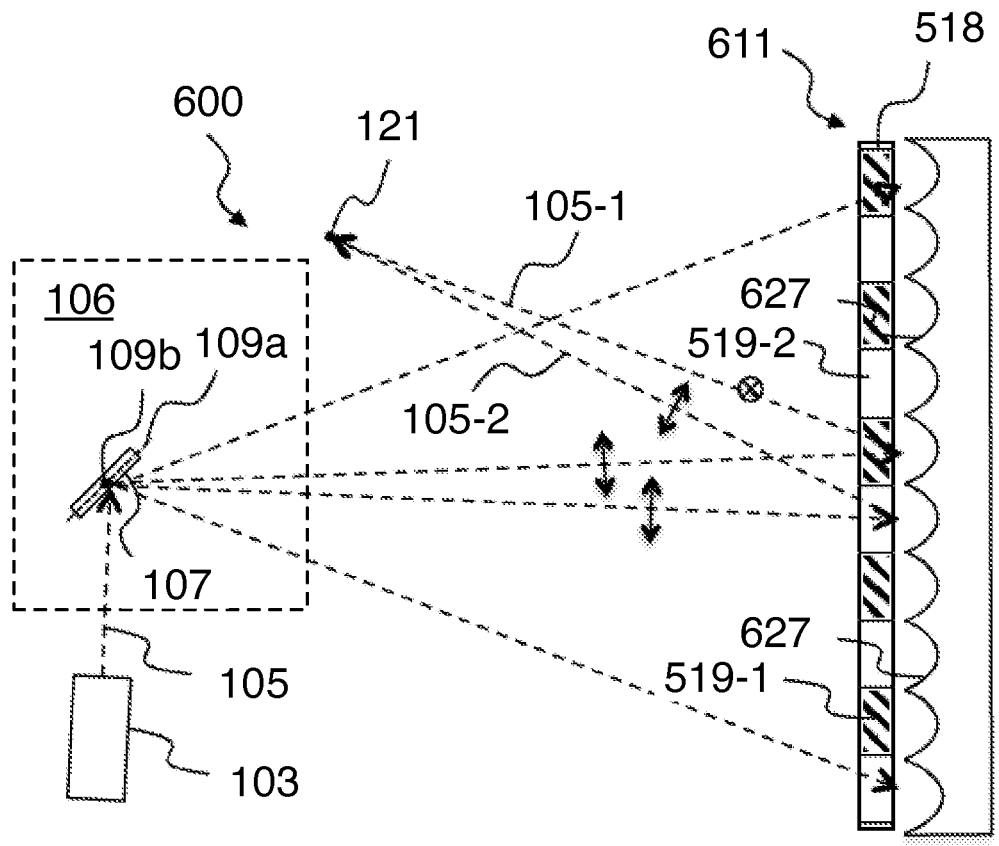
FIG. 6 illustrates a block diagram of a sixth example optical system.

FIG. 6 is a block diagram illustrating an example of an optical system 600. The optical system 600 is described with reference and use of the numeric designators of FIGS. 1 and 5 for convenience and clarity of presentation. However, the examples are not limited in this context.

It is noted, that the system 600 may includes a number of similar and/or same components as depicted in the system 500, including the light source 103 and the scanning mirror system 106. However, the system 600 includes a diffuser 611 including an array of micro-mirrors 627. In general, the micro-mirrors 627 may be similar to the micro-mirrors elements 527, with a notable distinction being the micro-mirrors 527 are concave in shape, as depicted. The diffuser 611 may operate similar to the diffuser 511 in that waves from the light beam 105 are reflected by the diffuser 611 and may have their polarization modified by the polarization grid 519 such that light waves reflected by the diffuser (e.g., diffused light waves 105-1 and 105-2, a diffused light beam, or the like) may not substantially interfere with each other.

FIGS. 7-10 are block diagrams illustrating example light polarization grids that can be implemented in the various diffusers described above. In particular, these light polarization grids may be implemented as any one of the light polarization grids described above, such as, for example, the elements 118, 318, or 518. Furthermore, the light polarization grids may be implemented in any of the diffusers (e.g., the diffuser 111, 211, 311, 411, 511, and/or 611, or the like) discussed above. It is noted, that the polarization grids and diffusers depicted in FIGS. 1-6 are depicted from a side view while the elements depicted in FIGS. 7-10 are depicted from a frontal view. In general, the elements described with respect to these figures are described with reference to the cells 119-a and 519-a discussed above. However, these figures may be implemented to provide the element 318 having patterned mirrors 323, for example. Examples are not limited in this context.

Figure 7:
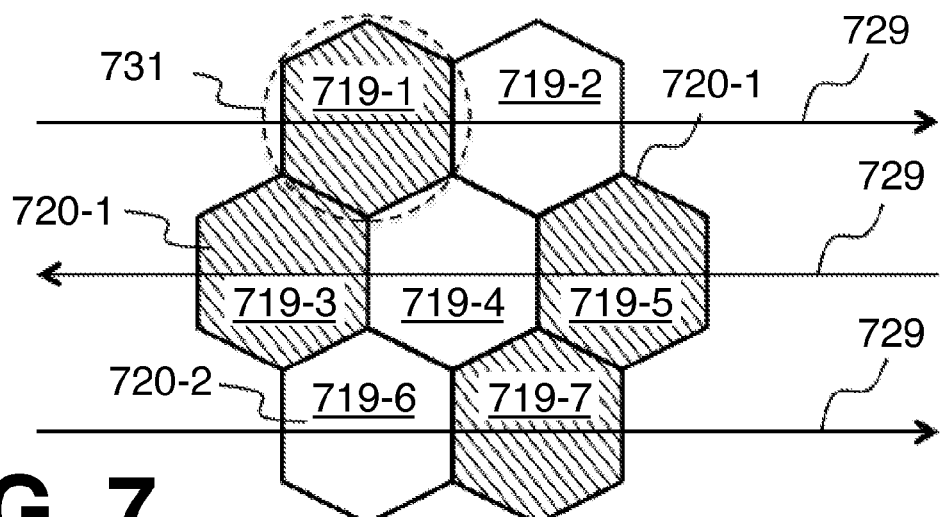
FIG. 7 illustrates a block diagram of a first example light polarization grid.

Turning more specifically to FIG. 7, a light polarization grid 718 is depicted. The element 718 may include cells 719-a grouped into cell groups 720-1 and 720-2. The first group of cells 720-1 (e.g., including the cells 719-1, 719-3, 719-5, and 719-7, or the like) are identified with forward hashing, while the second group of cells 720-2 (e.g., the cells 719-2, 719-4, and 719-6, or the like) do not have forward hashing. In some examples, the individual cells 719-a can have a hexagonal shape. Additionally, the overall shape of the array of cells may be hexagonal. It is to be noted that instead of the hexagonal shape depicted, the shapes of the individual cells 719-a may be implemented in the shape of the mirrors and/or lenses proximate to which the array of cells is disposed.

With some examples, the individual micro-focal lenses of the array of micro-focal lenses (e.g., the array 117 and/or 217) or the individual micro-mirrors of the array of micro-mirrors (e.g., the array 527 and/or 627) may have a substantially similar frontal shape and/or size as the individual cells 719-a.

During operation, as the mirror 107 of the scanning mirror system 106 rotates about a number of axes, the light beam 105 is scanned across the diffuser to diffuse the light beam 105, resulting in a diffused light beam, to include diffused light waves 105-1, 105-2, etc. With some examples, the light beam 105 may be scanned across the diffuser in a pattern indicated by arrows 729. In particular, the light beam 105 may be scanned over the groups of cells 720-1 and 720-2 in an alternating pattern. More specifically, the light beam 105 may be scanned over a cell from the first group 720-1, then a cell from the second group 720-2, followed again by a cell from the first group 719-1, etc. In some examples, the cells from the first and second groups of cells 720-1 and 720-2 may be disposed and/or arranged in the diffuser to facilitate such a scanning process.

With some examples, the diffuser may be stationary during operation and the scanning mirror system 106 implemented to scan the light beam 105 across the diffuser. With some examples, the light beam 105 may have a footprint (or spot size) 731, which has a diameter substantially similar to maximum dimension of the cells 719-a. With some examples, the light beam 105 can have a Gaussian light intensity distribution where the spot size 731 may correspond to approximately ½ of the maximum light intensity. In some examples, the maximum light intensity may be obtained and/or measured at the center of the spot size 731. It is noted, that due to the Gaussian intensity distribution, some part of the light beam 105 directed to a specific cell 719-a, also illuminates at least some of the neighboring cells 719-a, and therefore also the micro-focal elements located behind the cells. The adverse effects of this feature, which cause in traditional optical systems with diffusers the moiré pattern, may however, be eliminated by examples of the present disclosure as the diffused light beams from adjacent cells to not substantially interfere with each other.

Figure 8:
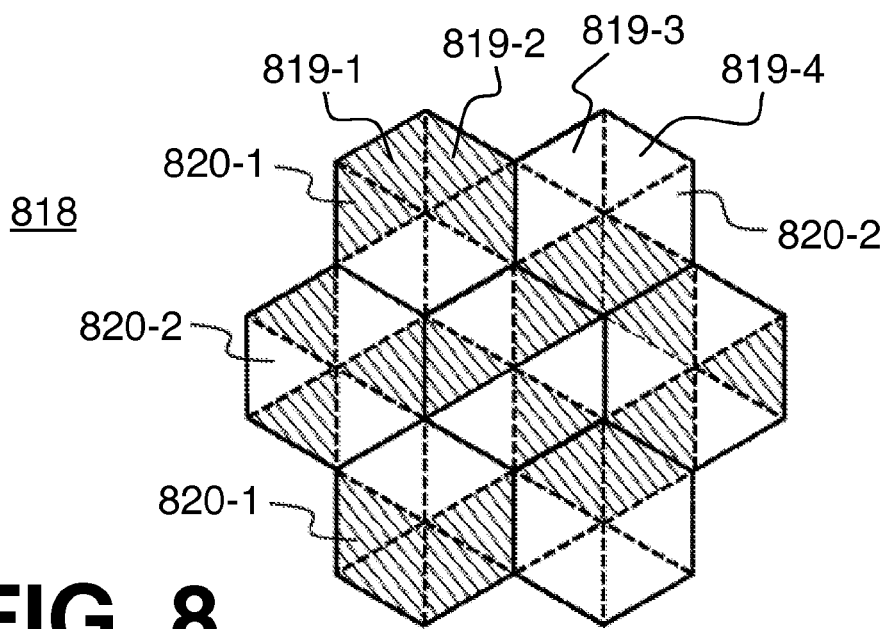
FIG. 8 illustrates a block diagram of a second example light polarization grid.

Turning more specifically to FIG. 8, a light polarization grid 818 is depicted. The element 818 may include individual cells 819-a, grouped into cell groups 820-1 and 820-2. The first group of cells 820-1 (e.g., the cells 819-1, 819-2, etc.) are identified with forward hashing, while the second group of cells 820-2 (e.g., the cells 819-3, 819-4, etc.) do not have forward hashing. In some examples, the individual cells 819-a can have a triangular shape. In the element 818, multiple cells 819-a may be associated (e.g., disposed over or proximate to) a respective individual micro-focal lenses of the array of micro-focal lenses (e.g., the array 117 and/or 217) or the individual micro-mirrors of the array of micro-mirrors (e.g., the array 527 and/or 627). For example, in this figure, the dashed lines may be indicative of a border around an individual cell 819-a while the solid line may be indicative of a border around a number of cells 819-a associated with an individual lens or mirror. Accordingly, in this example, each lens or mirror may be associated with six cells 819-a. However, examples are not to be limited in this context and a lens or mirror may associate with any number of cells 819-a, provided that number is at least one.

Figure 9:
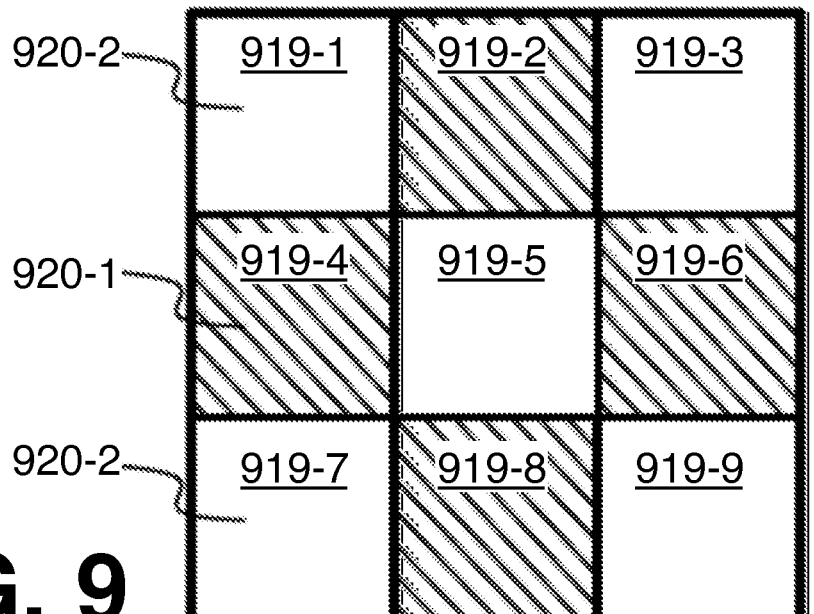
FIG. 9 illustrates a block diagram of a third example light polarization grid.

Turning more specifically to FIG. 9, a light polarization grid 918 is depicted. The element 918 may include cells 919-a grouped into cell groups 920-1 and 920-2. The first group of cells 920-1 (e.g., including the cells 919-2, 919-4, 919-6, and 919-8, or the like) are identified with forward hashing, while the second group of cells 920-2 (e.g., the cells 919-1, 919-3, 919-5, 919-7, and 919-9, or the like) do not have forward hashing. In some examples, the individual cells 919-a can have a square shape. Additionally, the overall shape of the array of cells may be square. With some examples, the individual micro-focal lenses of the array of micro-focal lenses (e.g., the array 117 and/or 217) or the individual micro-mirrors of the array of micro-mirrors (e.g., the array 527 and/or 627) may have a substantially similar frontal shape and/or size as the individual cells 919-a.

Figure 10:
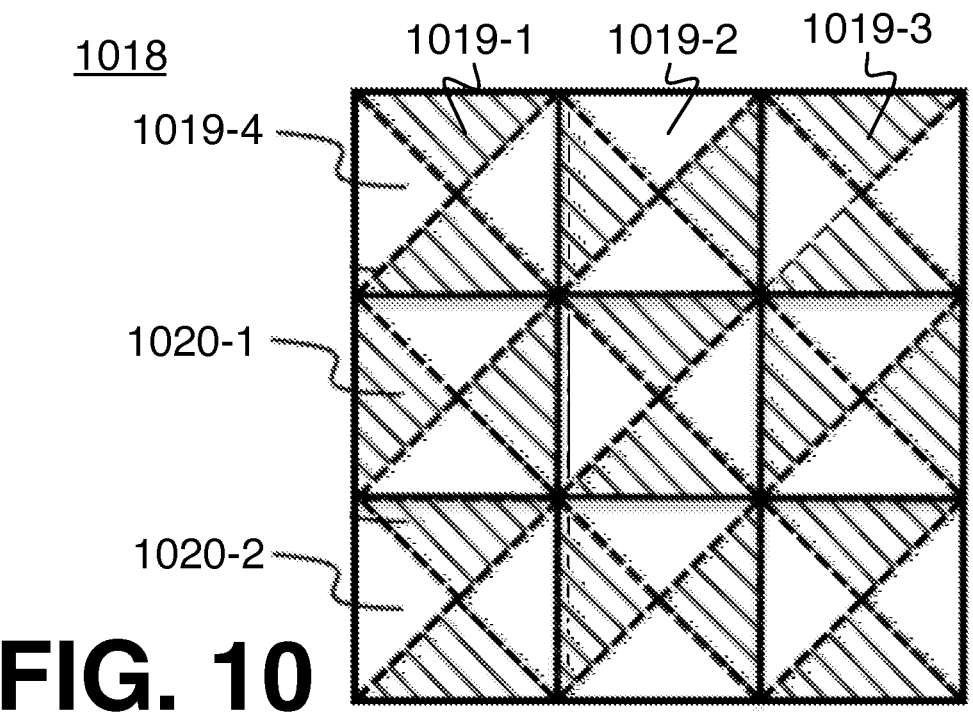
FIG. 10 illustrates a block diagram of a fourth example light polarization grid.

Turning more specifically to FIG. 10, a light polarization grid 1018 is depicted. The element 1018 may include individual cells 1019-a, grouped into cell groups 1020-1 and 1020-2. The first group of cells 1020-1 (e.g., the cells 1019-1, 1019-3, etc.) are identified with forward hashing, while the second group of cells 1020-2 (e.g., the cells 1020-2, 1020-4, etc.) do not have forward hashing. In some examples, the individual cells 1020-a can have a triangular shape. In the element 1018, multiple cells 1019-a may be associated (e.g., disposed over or proximate to) a respective individual micro-focal lenses of the array of micro-focal lenses (e.g., the array 117 and/or 217) or the individual micro-mirrors of the array of micro-mirrors (e.g., the array 527 and/or 627). For example, in this figure, the dashed lines may be indicative of a border around an individual cell 1019-a while the solid line may be indicative of a border around a number of cells 1019-a associated with an individual lens or mirror. Accordingly, in this example, each lens or mirror may be associated with four cells 1019-a. However, examples are not to be limited in this context and a lens or mirror may associate with any number of cells 1019-a, provided that number is at least one.

With some examples, the frontal shape of the cells in the diffuser (e.g., the cells 119-a, 319-a, the mirrors portions 323, the cells 519-a, 719-a, 819-a, 919-a, and/or 1019-a) may have other shapes not depicted here. For examples, the shape may be circular, octagonal, oval, or the like.

Furthermore, in some examples, the diffusers (e.g., the diffuser 118, 218, 318, 418, 518, 618) are depicted having a straight side profile (e.g., refer to FIGS. 1-6). However, with some examples, the diffuser could be implemented with a curved provide, such as, for example, a substantially spherical, semi-spherical, or parabolic profile. In some examples, the profile of the diffuser may be provided such that the cells (e.g., cells 119-a, 323-a, 519-a, or the like) are within a substantially equal distance from the scanning mirror system 106.

Figure 11:
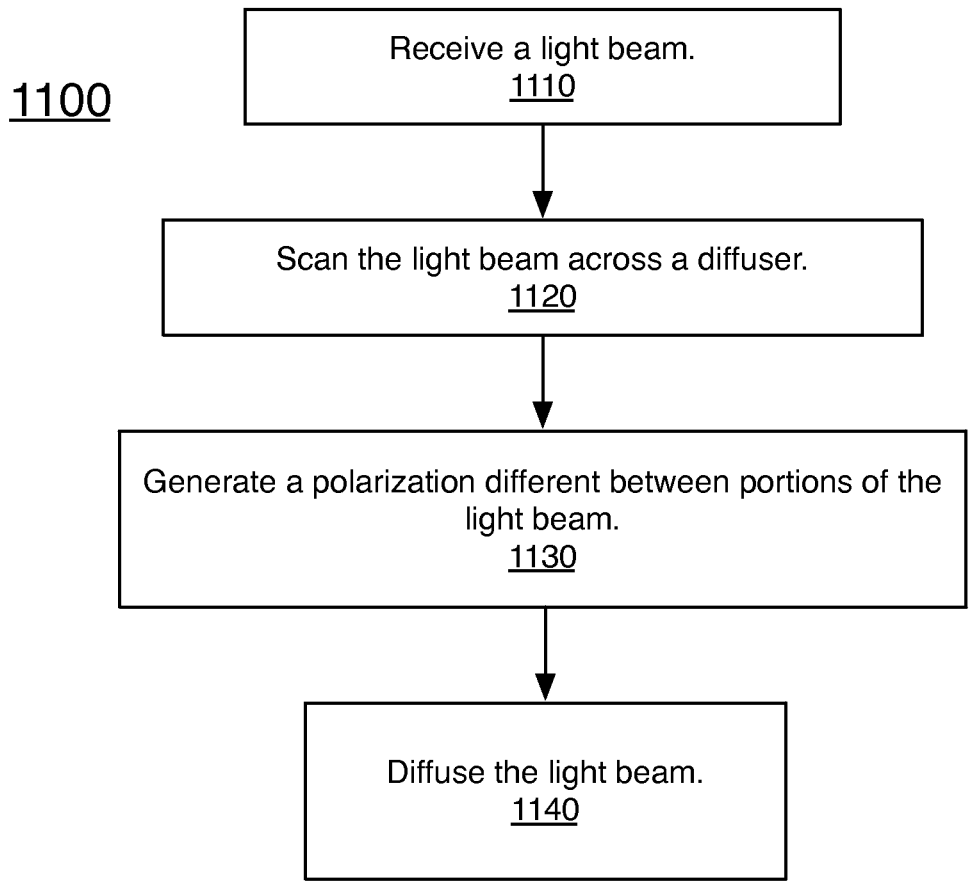
FIG. 11 illustrates a block diagram of a first example logic flow.

FIG. 11 illustrates a logic flow 1100 for diffusing a light beam according to examples of the present disclosure. The logic flow 1100 may begin at block 1110 "receive a light beam." At block 1110, the scanning mirror system 106 may receive a light beam. For example, the system 106 may receive the light beam 105 from the light source 103. In some examples, the light beam 105 may be a coherent light beam and/or a linearly polarized light beam.

Continuing to block 1120 "scan the light beam across a diffuser." At block 1120, the scanning mirror system 106 is activated to scan the light beam 105 across a diffuser, such as, for example, the diffusers 111, 211, 311, 411, 511, 611, or the like. In particular, the mirror 107 of the system 106 may be rotated about a number of axes to reflect waves of the light beam to different portions of the diffuser. For example, the system 106 may reflect first wave(s) of the light beam to a first cell of a light polarization grid of the diffuser and second wave(s) of the light beam to a second cell of the light polarization grid of the diffuser.

Continuing to block 1130 "generate a polarization difference between portions of the light beam." At block 1130, the polarization grid (e.g., 118, 318, 518, or the like) may change a polarization of at least one wave of the light beam 105 to create a difference in polarization between portions (e.g., wave, or the like) of the light beam 105. For example, the element 118 changes a polarization of the wave 105-1 such that the wave 105-1 and the wave 105-2 have a difference in polarization.

Continuing to block 1140 "diffuse the light beam." At block 1140, the diffuser (e.g., the diffuser 111, 211, 311, 411, 511, 611, or the like) may diffuse the light beam, including the differently polarized portions to cause at least two waves of the light beam to meet at a viewpoint. In some examples, the waves that are diffused to meet at a viewpoint have substantially orthogonal polarizations to reduce interference between the waves. For example, the light waves 105-1 and 105-2 are diffused to meet at point 121. However, as the waves 105-1 and 105-2 have orthogonal polarizations, they may not substantially interfere at point 121 to reduce a moiré pattern in an image projected with the light beam 105.

Figure 12:
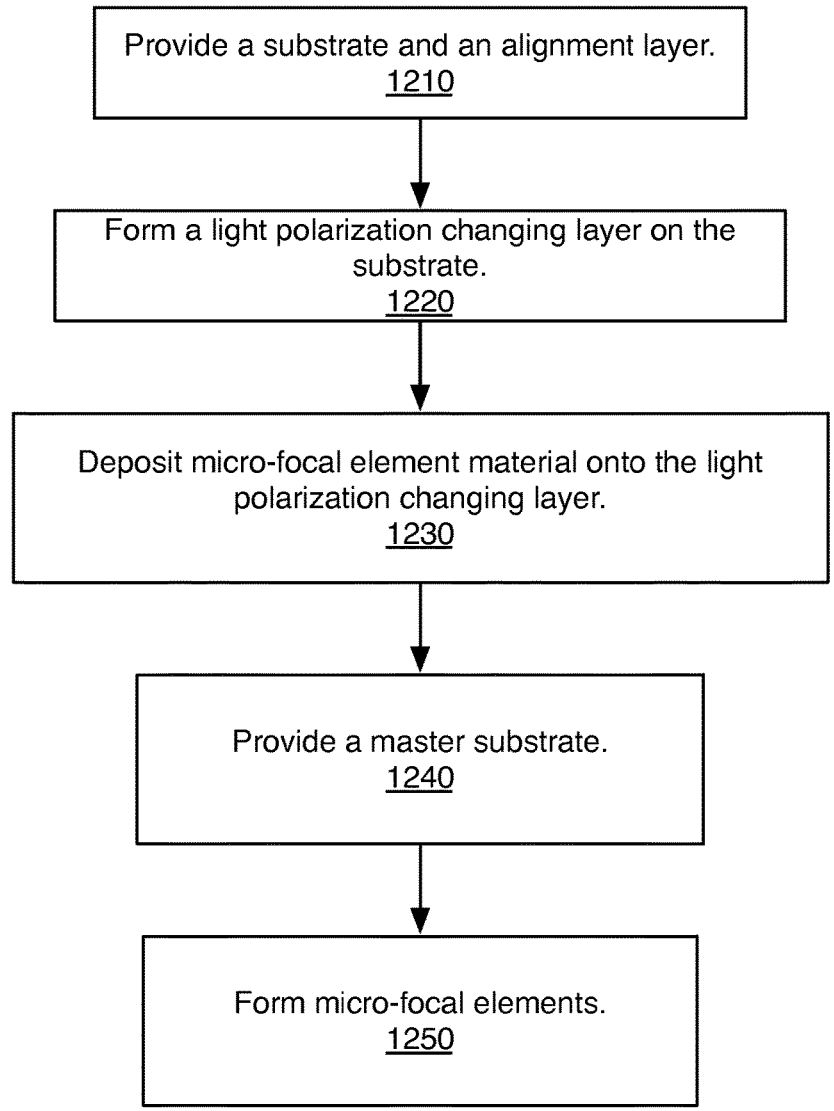
FIG. 12 illustrates a block diagram of a second example logic flow.
Figure 13:
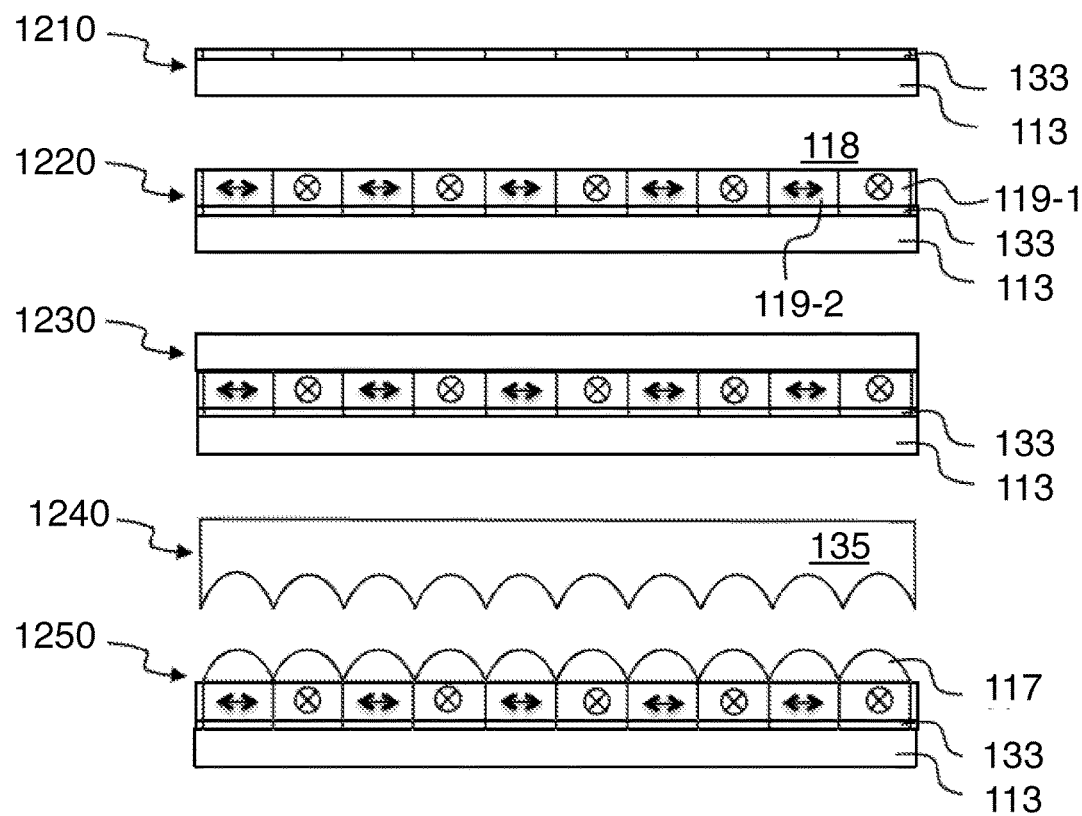
FIG. 13 illustrates a block diagram of a first example diffuser during manufacturing.

FIG. 12 illustrates a logic flow 1200 for manufacturing a diffuser, arranged according to examples of the present disclosure while FIG. 13 depicts a diffuser 1311 during portions of a manufacturing process. The logic flow 1200 is discussed in conjunction with the diffuser 1311. In particular, FIGS. 12-13 are described together. However, the logic flow 1200 may be implemented to manufacture any of a variety of diffusers according to the present disclosure, such as, for example, the diffusers 111, 211, 311, 411, 511, and/or 611. Examples are not limited in this context.

The logic flow 1200 may begin at block 1210. At block 1210 "provide a substrate and alignment layer" a substrate 113 and alignment layer 133 may be provided. With some examples, the alignment layer 133 may be deposited onto the substrate 113. With some examples, the alignment layer 133 may comprise a polymer based material. With some examples, the alignment layer 133 may be cured, such as, for example using heat.

Continuing to block 1220 "form a light polarization grid layer on the substrate" a light polarization grid layer (e.g., the grid 118) may be formed on the substrate 113. For example, optical axes may be defined in the alignment layer 133. In particular, the alignment layer 133 may be masked and ultra violet (UV) radiation applied to the layer to form optical axes. Subsequently, light polarization may be deposited, laminated, or the like) onto the alignment layer 133. For example, a liquid crystal polymer may be deposited onto the layer 133. Due to the nature of the polymer, it will align its optical axis to the optical axes defined in the layer 133. The light polarization material may be cured, such as, for example, by application of UV light. In some examples, the light polarization material may be cross-linked by application of UV light. As such, cells 119-1, 119-2, etc. of the element 118 may be formed.

Continuing to block 1230 "deposit micro-focal element material onto the light polarization layer" micro-focal element material is deposited onto the material of element 118.

Continuing to block 1240 "provide a master substrate" a master substrate 135 is provided. The master substrate 135 may be a mold or pattern to form micro-focal elements. The master substrate may comprise copper, nickel, glass, polymer, or the like.

Continuing to block 1250 "form micro-focal elements" the micro-focal elements 117 may be formed. For example, the micro-focal elements 117 may be formed via application of pressure, a hot embossing process, or the like. Additionally, the micro-focal element 117 may be cured, such as, for example, via application of UV light. In some examples, a reflective surface may be deposited onto the elements 117 (e.g., for form reflective or mirrors elements, or the like). For example, the reflective surface may comprise aluminum, silver, gold surface, a protective anti-corrosion substance, or some combination thereof. This protective anti-corrosion substance may include silicon dioxide, silicon nitride, titanium oxide, or tantalum pentoxide coating, or some combination thereof.

Figure 14:
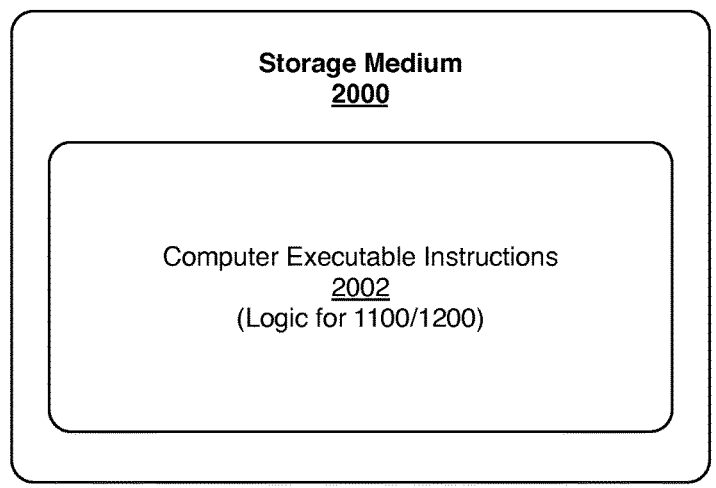
FIG. 14 illustrates a computer readable medium according to an embodiment.

FIG. 14 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 1100. As another examples, the storage medium 2000 may store various types of computer executable instructions to implement technique 1200.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
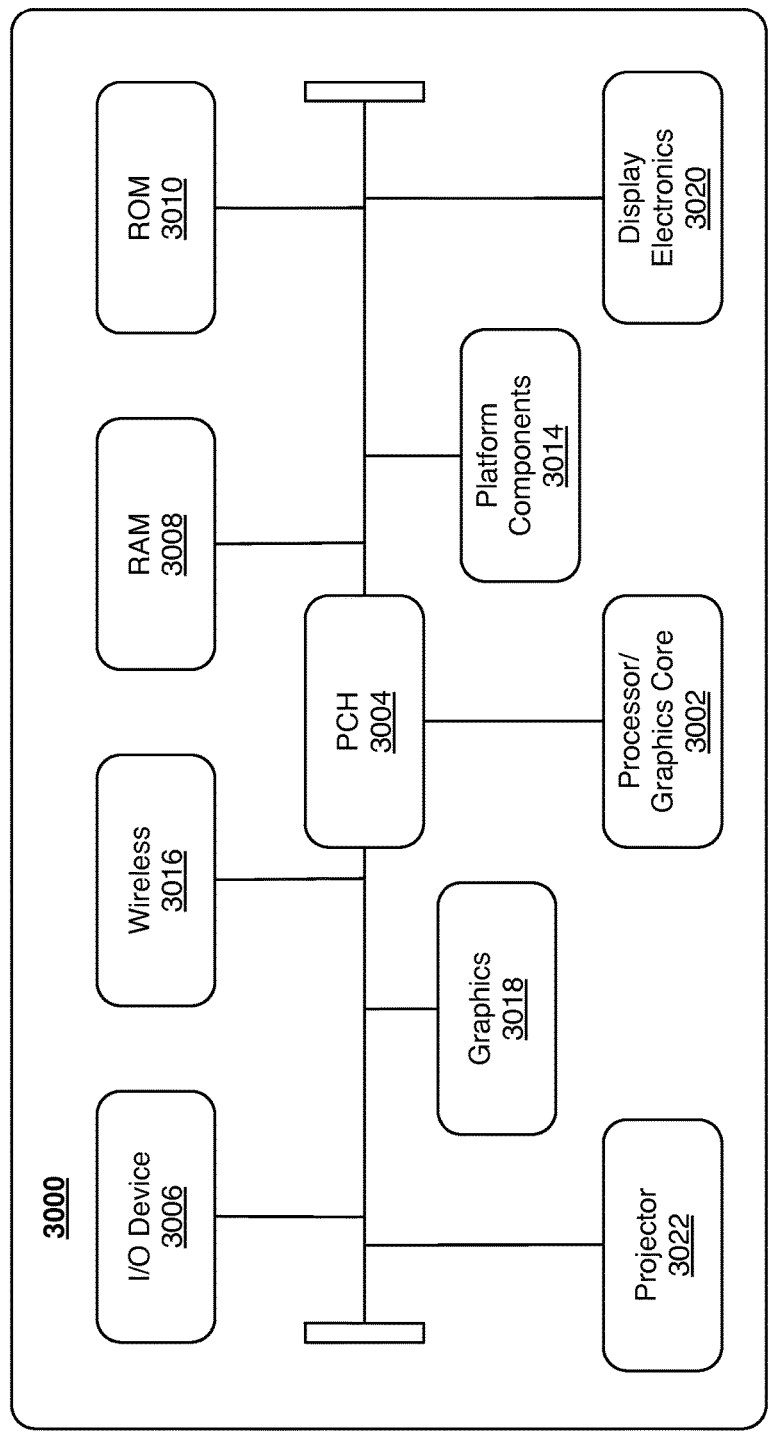
FIG. 15 illustrates a device according to an embodiment.

FIG. 15 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, projector 3022 (e.g., including the diffusers 111, 211, 311, 411, 511, 611, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus, comprising: a light polarization grid to receive a light beam and to change a polarization of a portion of the light beam; and an array of micro-focal elements optically coupled to the light polarization grid to diffuse the light beam.

Example 2

The apparatus of claim 1, the light polarization grid comprising a plurality of cells, a first group of the plurality of cells to change a polarization of at least a first wave of the light beam.

Example 3

The apparatus of claim 2, a second group of the plurality of cells to transmit at least a second wave of the light beam having a substantially original polarization.

Example 4

The apparatus of claim 3, the array of micro-focal elements to diffuse the first and second ray to meet at a point.

Example 5

The apparatus of claim 3, wherein polarization of the first wave and the polarization of the second wave are substantially non-interfering at the point.

Example 6

The apparatus of claim 3, wherein an orientation of an optical axis of the plurality of cells in the first group is different from an orientation of an optical axis of the plurality of cells in the second group.

Example 7

The apparatus of claim 3, the plurality of cells in the first group comprising at least a first material and the plurality of cells in the second group comprising at least a second material, wherein the first material is different than the second material.

Example 8

The apparatus of claim 3, wherein the plurality of cells in the first group comprising at substantially transparent material and wherein the plurality of cells in the second group of cells comprising a reflective material.

Example 9

The apparatus of claim 3, wherein the light beam is coherent and linearly polarized, the diffused first wave of the light beam has a first linear polarization, and the diffused second wave of the light beam have a second linear polarization orthogonal to the first linear polarization.

Example 10

The apparatus of claim 3, wherein the light beam is circularly or elliptically polarized, the diffused first wave of the light beam has a first circular or elliptical polarization, and the diffused second wave of the light beam have a second circular or elliptical polarization with a handedness opposite to the first circular or elliptical polarization.

Example 11

The apparatus of claim 3, wherein each element of the array of micro-focal elements is associated with at least one cell of the plurality of cells.

Example 12

The apparatus of claim 3, wherein at least the cells of the first group of cells or the second group of cells have a substantially rectangular, hexagonal, circular, or triangular frontal shape.

Example 13

The apparatus of claim 1, the light polarization grid comprising a quarter-wave plate, a half-wave plate, liquid crystal material, photo-aligned liquid crystal material, or photo-aligned cross linkable liquid crystal material.

Example 14

The apparatus of claim 1, wherein the light polarization grid is optically coupled to the array of micro-focal elements to diffuse the light beam after the polarization of the portion of the light beam is changed.

Example 15

The apparatus of claim 1, wherein the micro-focal elements comprise at least one micro-lens or micro-mirror.

Example 16

The apparatus of claim 1, wherein the array of micro-focal elements has a substantially semi-spherical shape.

Example 17

A system comprising: an optical diffuser; and a scanning mirror system to receive a light beam and to scan the light beam across the optical diffuser, the optical diffuser comprising: a light polarization grid to receive a light beam and to change a polarization a portion of the light beam; and an array of micro-focal elements optically coupled to the light polarization grid to diffuse a light beam.

Example 18

The system of claim 17, comprising a light source to emit the light beam.

Example 19

The system of claim 17, the scanning mirror system comprising a mirror to rotate about at least one axis to scan the light beam across the optical diffuser.

Example 20

The system of claim 17, the light polarization grid comprising a plurality of cells, a first group of the plurality of cells to change a polarization of at least a first wave of the light beam.

Example 21

The system of claim 20, a second group of the plurality of cells to transmit at least a second wave of the light beam having a substantially original polarization.

Example 22

The system of claim 21, the array of micro-focal elements to diffuse the first and second ray to meet at a point.

Example 23

The system of claim 21, wherein polarization of the first wave and the polarization of the second wave are substantially non-interfering at the point.

Example 24

The system of claim 21, wherein an orientation of an optical axis of the plurality of cells in the first group is different from an orientation of an optical axis of the plurality of cells in the second group.

Example 25

The system of claim 21, the plurality of cells in the first group comprising at least a first material and the plurality of cells in the second group comprising at least a second material, wherein the first material is different than the second material.

Example 26

The system of claim 21, wherein the plurality of cells in the first group comprising at substantially transparent material and wherein the plurality of cells in the second group of cells comprising a reflective material.

Example 27

The system of claim 21, wherein the light beam is coherent and linearly polarized, the diffused first wave of the light beam has a first linear polarization, and the diffused second wave of the light beam have a second linear polarization orthogonal to the first linear polarization.

Example 28

The system of claim 21, wherein the light beam is circularly or elliptically polarized, the diffused first wave of the light beam has a first circular or elliptical polarization, and the diffused second wave of the light beam have a second circular or elliptical polarization with a handedness opposite to the first circular or elliptical polarization.

Example 29

The system of claim 21, wherein each element of the array of micro-focal elements is associated with at least one cell of the plurality of cells.

Example 30

The system of claim 21, wherein at least the cells of the first group of cells or the second group of cells have a substantially rectangular, hexagonal, circular, or triangular frontal shape.

Example 31

The system of claim 17, the light polarization grid comprising a quarter-wave plate, a half-wave plate, liquid crystal material, photo-aligned liquid crystal material, or photo-aligned cross linkable liquid crystal material.

Example 32

The system of claim 17, wherein the light polarization grid is optically coupled to the array of micro-focal elements to diffuse the light beam after the polarization of the portion of the light beam is changed.

Example 33

The system of claim 17, wherein the micro-focal elements comprise at least one micro-lens or micro-mirror.

Example 34

The system of claim 17, wherein the array of micro-focal elements has a substantially semi-spherical shape.

Example 35

The system of claim 17, wherein the array of micro-focal elements is disposed between the scanning mirror system and the light polarization grid.

Example 36

The system of claim 17, wherein the light polarization grid is disposed between the scanning mirror system and the array of micro-focal elements.

Example 37

A method comprising: receiving a light beam from a light source; changing a polarization of a first portion of the light beam; and diffusing the light beam to transmit the first portion of the light beam and a second portion of the light beam to a view point.

Example 38

The method of claim 37, wherein the first portion of the light beam and the second portion of the light beam have different polarizations at the view point.

Example 39

The method of claim 38, wherein the polarization of the first portion of the light beam is orthogonal to the polarization of the second portion of the light beam.

Example 40

The method of claim 38, wherein the polarization of the first portion of the light beam has an opposite handedness to the polarization of the second portion of the light beam.

Example 41

The method of claim 38, comprising changing the polarization of the portion of the light beam before diffusing the light beam.

Example 42

A method comprising: depositing a light polarization grid onto a substrate, the light polarization grid comprising: a first light polarization region; and a second light polarization region configured to generate a difference in the polarization between a first wave of light incident on the first light polarization region and a second wave of light incident on the second light polarization region; depositing a transparent substrate on the light polarization element; and patterning the transparent substrate with a shaped mask.

Example 43

The method of claim 42, comprising curing the transparent substrate.

Example 44

The method of claim 43, patterning the transparent substrate comprising hot embossing, stamping, or applying pressure to create a micro-patterned surface.

Example 45

The method of claim 44, wherein curing the transparent substrate cures the micro-patterned surface.

Example 46

The method of claim 45, wherein the mask is on a roller, patterning the transparent substrate comprises: rotating the roller around a rotational axis; pushing the substrate against the roller; and moving the substrate to allow various areas of the substrate to be patterned.

Example 47

At least one non-transitory computer-readable storage medium comprising instructions that, when executed by a processor, cause the processor to implement the method of any one of claims 37 to 46.

Example 48

An apparatus comprising means to perform the method of any one of claims 37 to 46.

Example 49

A system comprising: a light polarization grid to receive a plurality of waves of a light beam, each of the plurality of waves to have an initial polarization, the light polarization grid comprising a plurality of cells, a first group of the plurality of cells to change the initial polarization of at least a first one of the plurality of waves, a second group of the plurality of cells to transmit at least a second one of the plurality of waves with the initial polarization; and an array of micro-focal elements optically coupled to the light polarization grid to diffuse the light beam.

Example 50

The system of claim 49, comprising a scanning mirror system to receive the light beam and to scan the light beam across the light polarization grid.

Example 51

The system of claim 50, the array of micro-focal elements to diffuse the first one and the second one of the plurality of waves to meet at a point, wherein polarization of the first wave and the polarization of the second wave are substantially non-interfering at the point.

Example 52

The system of claim 51, wherein the initial polarization is linear, the first group of the plurality of cells to change the initial polarization of at least the first one of the plurality of waves to be orthogonal to the initial polarization.

Example 53

The system of claim 51, wherein the initial polarization is circular, the first group of the plurality of cells to change the handedness of the polarization of at least the first one of the plurality of waves.

What is claimed is:
1. A system comprising:
   an optical diffuser; and
   a scanning mirror system to receive a light beam and to scan the light beam across the optical diffuser, the optical diffuser comprising:
      a light polarization grid to receive a light beam and to change a polarization a portion of the light beam; and
      an array of micro-focal elements optically coupled to the light polarization grid to diffuse the light beam.
2. The system of claim 1, the scanning mirror system comprising a mirror to rotate about at least one axis to scan the light beam across the optical diffuser.
3. The system of claim 1, the light polarization grid comprising a plurality of cells, a first group of the plurality of cells to change a polarization of at least a first wave of the light beam and a second group of the plurality of cells to transmit at least a second wave of the light beam having a substantially original polarization.
4. The system of claim 3, the array of micro-focal elements to diffuse the first and second wave to meet at a point, wherein polarization of the first wave and the polarization of the second wave are substantially non-interfering at the point.
5. The system of claim 1, wherein the array of micro-focal elements is disposed between the scanning mirror system and the light polarization grid.
6. The system of claim 1, wherein the light polarization grid is disposed between the scanning mirror system and the array of micro-focal elements.

7. A system comprising:
a scanning mirror system to receive a light beam and to scan the light beam across a light polarization grid;
the light polarization grid to receive a plurality of waves of the light beam, each of the plurality of waves to have an initial polarization, the light polarization grid comprising a plurality of cells, a first group of the plurality of cells to change the initial polarization of at least a first one of the plurality of waves, a second group of the plurality of cells to transmit at least a second one of the plurality of waves with the initial polarization; and
an array of micro-focal elements optically coupled to the light polarization grid to diffuse the light beam.

8. The system of claim 7, the array of micro-focal elements to diffuse the first one and the second one of the plurality of waves to meet at a point, wherein polarization of the first wave and the polarization of the second wave are substantially non-interfering at the point.

9. The system of claim 8, wherein the initial polarization is linear, the first group of the plurality of cells to change the initial polarization of at least the first one of the plurality of waves to be orthogonal to the initial polarization.

10. The system of claim 8, wherein the initial polarization is circular, the first group of the plurality of cells to change the handedness of the polarization of at least the first one of the plurality of waves.

* * * * *